Feb. 24, 1953 — P. E. GRANDMONT — 2,629,823
PULSE GENERATOR
Filed May 7, 1949
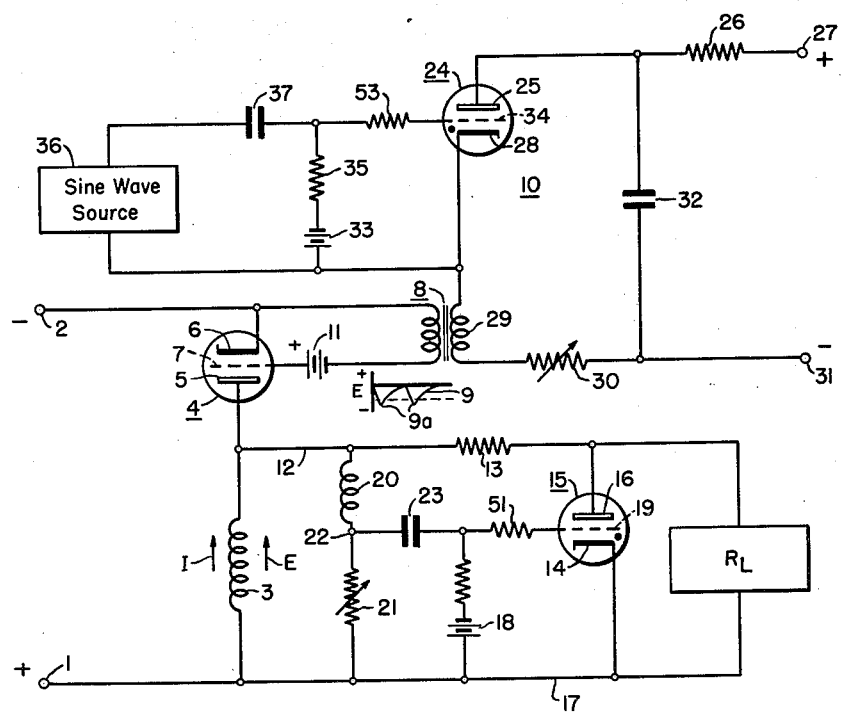
WITNESSES:
Robert C. Baird
Nw. C. Groome
INVENTOR
Paul E. Grandmont.
BY
Hymen Diamond.
ATTORNEY Patented Feb. 24, 1953

2,629,823

UNITED STATES PATENT OFFICE 2,629,823

PULSE GENERATOR

Paul E. Grandmont, East Orange, N. J., assignor to Westinghouse Electric Corporation, East Pittsburgh, Pa., a corporation of Pennsylvania Application May 7, 1949, Serial No. 91,929

8 Claims. (Cl. 250—27)

This invention relates generally to pulse generators, and more particularly to pulse generators for providing extremely short rectangular pulses at high-voltage levels from a low-voltage power source.

It is a broad object of the invention to provide a novel pulse generator.

It is a more particular object of the invention to provide a novel pulse generator of simple character for generating high-voltage pulses of adjustable duration, the pulse generator being powered from a low-voltage source.

It is another object of the invention to provide a novel pulse generator which is subject to synchronization by a periodic low-voltage signal over a wide range of pulse frequencies.

Briefly described, the present invention provides a system for generating short, substantially rectangular, voltage pulses at a relatively high-voltage level. The generator derives power from a direct-current supply of moderate current and voltage rating, and is synchronized by signals supplied by a generator of saw-tooth or exponential triggering pulses.

The direct-current supply charges an inductor which may be of large magnitude via a vacuum tube over a relatively long period of time, the saw-tooth or exponential triggering pulses periodically driving the vacuum tube to cutoff for short intervals. A voltage of self-inductance then appears across the inductor, which is transferred to a load circuit. The latter is shunted by a normally unfired thyratron, and the voltage of self-inductance is applied to the control electrode of the thyratron, in firing polarity, via an adjustable delay circuit. The thyratron fires after a predetermined delay and short-circuits the voltage appearing across the load. A resistor is provided in the inductor circuit for suppressing oscillations which may arise from coaction of the inductor and the parasitic capacitances in the leads and the other components (for example, tube electrodes) of the circuit.

The frequency of the generated pulses is determined by the frequency of the saw-tooth or exponential triggering pulses, and the duration of the pulses by the delay introduced between cut-off of the vacuum tube and firing of the thyratron.

The voltage available across the inductor may far exceed the voltage of the direct-current supply, which is in contra-distinction to pulse-generating systems heretofore known in the art, wherein the supply voltage must exceed the voltage of the output pulses.

Further objects, features and advantages of the present invention will become apparent upon consideration of the following detailed description of a specific embodiment of the invention, especially when taken in conjunction with the appended drawing, the single figure of which illustrates in schematic circuit diagram one form of the invention.

Referring now more particularly to the drawing, the reference numerals 1 and 2 denote, respectively, the positive and negative terminals of a source of voltage supply, across which is connected in series an inductor 3 and a vacuum tube triode 4, the triode 4 having an anode 5 connected via the inductor 3 with the positive terminal 1 and having a cathode 6 connected directly with the negative terminal 2. The triode 4 further comprises a control electrode 7, which is energized, via a transformer 8, by saw-tooth or exponential pulses 9 of negative polarity, the latter being derived from a saw-tooth or exponential voltage generator generally denominated by the reference numeral 10, which will be described more fully hereinafter.

The triode 4 normally passes current by virtue of a positive bias applied to the control electrode 7 thereof, as by means of any convenient source of positive potential, conventionally illustrated as a battery 11. The positive bias provided by the bias source 11 is overcome by the peaks 9a of the saw-tooth voltages 9 sufficiently to block the tube 4 once for each voltage wave 9. Accordingly, the triode 4 passes current for relatively long periods of time, interrupted periodically by relatively short periods of cutoff. While the triode 4 is passing current, energy is stored in the inductor 3. The cutoff of the triode 4 results in sudden cessation of current flow in the inductor 3, which causes generation of a voltage of self-inductance therein having the polarity of the normal flow of current in the inductor 3, since, by Lenz' law, when current in an inductor is interrupted a voltage is generated having a polarity such as to tend to continue the original flow of current.

The voltage appearing across the inductor 3 is applied via the lead 12 and the resistance 13 to a load device $R_L$, conventionally illustrated, the circuit of the load device $R_L$ being completed via the lead 17 to the positive terminal 1 of the voltage supply.

The load device $R_L$ is shunted by a gaseous conduction device 15, which may be, specifically, a thyratron, and which comprises an anode 16 connected to the lead 12 via the resistance 13, and a cathode 14 connected directly to the lead 17. The thyratron 15 is normally maintained in unfired or non-conductive condition by means of a bias source 18, which applies negative potential to the control electrode 19 thereof.

An inductance 20 connected in series with a variable resistance 21 are shunted across the inductor 3, control electrode 19 of the thyratron 15 being connected to the junction point of the inductor 20 and the variable resistor 21 via a current-limiting resistor 21 and a coupling capacitor 23. Accordingly, the potential appearing across the variable resistor 21 is transferred to the control electrode to cathode circuit of the thyratron 15, and, the junction point 22 being driven to positive polarity when the triode 4 is cut off, a voltage is developed which is sufficient in magnitude and of proper polarity to fire the thyratron 15. This voltage, however, does not appear immediately, due to the delay action of the inductance 20 in series with the variable resistance 21, which serves to introduce a delay in buildup of the voltage appearing across the resistance 21 by delaying current flow in the circuit comprising inductance 20 and resistance 21 in series. Accordingly, a firing potential appears on the control electrode 19 of the thyratron 15 only after a time interval following appearance across the load $R_L$ of the voltage available on the inductor 3 in response to cutoff of the triode 4. When the thyratron 15 fires the voltage across the load $R_L$ decreases substantially to zero, since the thyratron 15, when fired, constitutes effectively a short circuit. Thereafter the control voltage or triggering voltage 9 decreases to a sufficiently low value to enable the triode 4 to again conduct, and the cycle of events to repeat.

The current from inductor 3 to thyratron 15 flows through resistor 13. The primary function of this resistor is to suppress oscillations arising from the coaction of the inductor 3 and parasitic capacities. Preferably, resistor 13 should be as small as it can be consistent with its function.

A portion of the magnetic energy stored in the inductor 3 is dissipated in resistor 13 and in the drop across thyratron 15. The remainder of the stored energy may be substantial, particularly if inductor 3 is large as it preferably should be. This remainder is counteracted by the current flow through the tube 4 as it builds up as the trailing edge of the triggering voltage decreases. As this change takes place, the current through inductor 3 rises again, the self-inductance voltage rise changes to a drop, and the thyratron 15 extinguishes.

This cycle of operations could occur with a rather small variation in the energy stored in inductor 3 if the period of cutoff of triode 4 is small compared to the ratio: inductance of 3/res. of 13+res. of $R_L$, and renewal of conduction through triode 4 occurs very soon after the firing of thyratron 15. Operation in this manner would convert the low-voltage direct current of the source into high-voltage pulse energy at $R_L$ with a higher efficiency.

It may be helpful in understanding the operation of the circuit to note that since the pulses produced are always of rather short duration compared to the repetition period, the use of a fairly large inductor is quite feasible, since a relatively long period is available to charge it between pulses, from the low-voltage supply. During the pulse period then, the time constant value T, which is the ratio of the inductance to the resistance, is large, so that the inductor current, decaying at a rate proportional to $$E\left(-\frac{t}{T}\right)$$

(where E is the natural logarithm base) will drop off very slightly. In these circumstances, the inductor behaves approximately as a source of constant current. Considering it in this light, at the instant of cutoff of triode 4, a current I flows in inductor 3. When triode 4 ceases conduction, this current must continue flowing, which it will do through resistors 13 and $R_L$, generating a high-voltage pulse across the high value of $R_L$. Then on firing of thyratron 15, a much lower impedance path is provided, and the current will take it, maintaining its same value. Then when triode 4 starts to conduct again, the current through it increases as its grid potential rises, the inductive drop on inductor 3 dropping from maximum thyratron drop to minimum, when the thyratron extinguishes. The full current is then reestablished through triode 4 and its direct-current supply.

The frequency of the pulses appearing across the load $R_L$ are determined, by the frequency of the synchronizing or triggering impulses 9. The duration of the pulses appearing across the load $R_L$, on the other hand, are determined by the value of the resistor 21, since it is the quotient $L/R$ which determines the time constant of the circuit comprising inductance 20 and resistance 21, L being the self-inductance of the inductor 20, and R being the resistance of the resistor 21.

The saw-tooth or exponential triggering wave 9 may be derived in any convenient fashion. Since these waves must be of relatively considerable magnitude, however, I prefer to utilize a source of saw-tooth voltages synchronized from a convenient low-powered source of sine wave signal, or signals of any other character which may be conveniently and economically generated.

In accordance with one specific embodiment of the invention, I provide a gaseous conduction device 24 which may be, specifically, a thyratron, the anode 25 of which is connected in series with a charging resistor 26 to the positive terminal 27 of a source of a direct-current voltage. The cathode 28 of the thyratron 24 is connected in series with the primary winding 29 of the transformer 8, and in series further with an adjustable resistor 30 and a negative terminal 31 of the voltage supply. Connected directly from the anode 25 of the thyratron 24 to the negative terminal 31 of the voltage supply is a condenser 32. A source of negative bias 33 is connected between the cathode 28 of the thyratron 24 and the control electrode 34 thereof, via a current-limiting resistor 53 and a protective resistance 35. A source of sine wave voltage 36 of relatively low magnitude is then connected between the control electrode 34 and the cathode 28 of the thyratron 24 via a coupling condenser 37.

Briefly describing now the operation of the system comprising the present invention, condenser 32 charges relatively slowly over the charging resistor 26, supplying a gradually increasing positive potential to the anode 25 of the thyratron 24. The thyratron 24, nevertheless, does not fire, by reason of the negative biasing potential applied to the control electrode 34 thereof, until such time as the negative bias is overcome by signal deriving from the sine wave source 36. At such times the thyratron 24 fires, discharging the condenser 32 through the primary winding 29 of the transformer 8 and the variable resistor 30. As soon as the thyratron 24 has fired and the condenser 32 discharged therethrough, the potential across the thyratron 24 is reduced substantially to zero and the thyratron 24 deionized. The condenser 32 then proceeds to accumulate another charge pursuant to generation of a further pulse in response to further firing of the thyratron 24. Each pulse of current flowing through the primary winding 29 of the transformer 8 transfers a high-voltage negatively polarized signal to the control electrode 7 of the triode 4, serving to block the latter for a short interval. Prior to blockage current flow through the conductor 3 via the triode 4 occurs in the direction of the arrow labeled "I." Immediately upon cutoff of the triode 4, the current flow in the inductor 3 is interrupted, resulting in generation of a voltage of self-inductance in the direction of the arrow labeled "E," which is applied to the load $R_L$ over the lead 12 and via the resistor 13. The same voltage is also applied to thyratron 15 shunting the load $R_L$, the thyratron 15 being normally cut off and prevented from firing by a negative bias applied to the control electrode 19 thereof by a suitable bias source 18. The voltage developed across the inductor 3 likewise is applied in series with a timing inductor 20 connected in series with an adjustable resistor 21, and serves to build up across the resistor 21 a voltage of positive polarity as seen from the junction point 22 of the inductor 20 and the resistor 21, positive potential of the junction point 22 attaining a value sufficient to fire the thyratron 15 only after a time delay determined by the relative values of the inductance 20 and the resistance 21, which may, accordingly, be adjusted by varying the value of the adjustable resistance 21. As soon as the voltage across the resistance 21 attains a value sufficiently great to fire the thyratron 15, and the latter fires and the voltage across the load $R_L$ decreases substantially to zero, signaling the end of a voltage pulse in the load $R_L$.

The voltage wave 9 supplied by the transformer 8 to the control electrode 7 of the triode 4 next decays sufficiently to enable the triode 4 to again conduct current, and again to supply energy to the inductor 3, whereupon the entire cycle of events repeats itself.

In considering the cycle of operation where the inductor current is carried by thyratron 15, some points should be noted. It is easily shown that if resistor 13 is small enough to neglect (or zero), the inductor current, if allowed to flow indefinitely through the thyratron, would be given by the equation:

$$i = I - \frac{e}{L_3} t$$

where $i$ = current in inductor 3 at any time (amps.)
$I$ = current in inductor at instant thyratron 15 fires (amps.)
$e$ = arc drop of 15 (volts)
$L_3$ = inductance of 3 (henries)
$t$ = time from firing of 15 (seconds).

Since the drop in inductor current indicates a loss of energy without useful output, it should be kept to a minimum. This condition is approached by making the value $e$ (arc drop of 15) as low as possible. Since this condition is also necessary for a rapid drop in the load current to the lowest value possible at the end of the pulse, the use of a low-drop thyratron as element 15 of the circuit appears to perform two functions of importance: (1) providing an abrupt drop to a very low value for the load voltage at the end of a pulse; (2) providing a low-energy-loss path for the current of inductor 3 in the interval between the end of load pulse and renewed conduction of triode 4.

It will be realized that while the saw-tooth or exponential wave generator 10 may be synchronized by means of a sine wave or other convenient source 36, the latter may also be self-synchronizing, or run as a free oscillator, merely by removing the sine wave source 36. In the latter case, the charging condenser 32 will periodically charge to a value sufficient to break down the thyratron 24, for a range of fixed bias established on the control electrode 34 thereof by the source 33. The condenser 32 will discharge when the thyratron 24 fires, the thyratron will deionize, and thereafter the condenser 32 will accumulate a further charge via the charging resistor 26. The frequency of the generator 10 will then be determined by the time constant of the condenser 32 and the resistor 26, and by the potentials applied to the anode and control electrode of the thyratron 24.

I claim as my invention:

1. A pulse generator comprising in combination, a vacuum tube having a cathode and an anode, a source of direct current voltage, an inductor connected in series with said anode and cathode across said source of direct current voltage, means normally maintaining said vacuum tube conductive to provide current flow in said inductor, means for periodically blocking said vacuum tube to form the leading edge of a pulse, a load circuit connected in series with said inductor, a normally blocked electronic valve shunted across said load circuit, and means for rendering said electronic valve conductive at a predetermined time interval after blocking of said vacuum tube to form the trailing edge of said pulse.

2. In combination, a vacuum tube having a cathode, an anode and a control electrode, positive and negative direct current voltage terminals, an inductor, means for connecting said inductor in series with said anode and cathode across said terminals, a source of periodic peaked triggering impulses, means normally biasing said control electrode to maintain said vacuum tube conductive, means for applying said triggering impulses to said control electrode periodically to block said vacuum tube, a load circuit connected across said inductor, a normally blocked gaseous conduction device connected across said load circuit, a timing inductor and a variable resistor connected in series across said gaseous conduction device, said gaseous conduction device having a control electrode, and means coupling said last named control electrode to the junction of said timing inductor and said variable resistor.

3. A pulse generator comprising in combination, an inductor, means for transferring current through said inductor, a load connected in shunt with said inductor means for providing periodic interruptions of said current to initiate pulses and means for periodically shunting said load at predetermined time intervals after each interruption of said current, to terminate said pulses.

4. In combination, an inductor, means for transferring current through said inductor, a load device connected in shunt with at least a portion of said inductor, means for providing periodic interruptions of said current to initiate pulses, normally open circuit closing means connected in shunt with said load device, and means for closing said circuit closing means at a predetermined time interval after each interruption of said current, to terminate said pulses.

5. A pulse generator comprising in combination, an energy storing inductor, means for causing direct current to flow in said inductor, means for periodically abruptly interrupting said current flow to generate the leading edge of a pulse, a load device connected in shunt with said inductor, and means for short circuiting said load device at a predetermined time interval after each closing of said circuit closing means to form the trailing edge of said pulse.

6. In combination, a pulse forming network, comprising, an energy storing inductor, a source of current, circuit closing means adapted to be opened and closed for transferring current from said source to said energy storing inductor, means for periodically closing said circuit closing means to initiate a pulse, a load device, a normally non-conducting gaseous conduction device connected in shunt to said load device, means connecting said load device in shunt to at least a portion of said energy storing inductor, and means for rendering conductive said gaseous conduction device at a predetermined instant following closing of said circuit closing means; to terminate said pulse.

7. In combination, a pulse forming network, comprising, an energy storing inductor, a source of current, a normally conducting electronic valve connected between said energy storing inductor and said source of current, means for periodically rendering non-conductive said normally conducting electronic valve, a load device, a normally non-conducting electronic tube connected in shunt to said load device, means connecting said load device in shunt to at least a portion of said energy storing inductor, and delay means responsive to said first mentioned means for rendering conductive said electronic tube at a predetermined instant following operation of said first mentioned means.

8. In combination, a pulse forming network, comprising, an energy storing inductor, a source of unidirectional current, a normally conducting electronic valve connected between said source and said inductor, means for periodically rendering non-conductive said normally conducting electronic valve to develop a voltage of self-inductance in said inductor, a load device, means for applying said voltage of self-inductance to said load device, normally inoperative means for substantially short-circuiting said load device, and delay means responsive to said voltage of self-inductance only after a predetermined interval for rendering operative said means for substantially short-circuiting said load device.

PAUL E. GRANDMONT.

REFERENCES CITED

The following references are of record in the file of this patent:

UNITED STATES PATENTS

| Number | Name | Date |
|---|---|---|
| 2,419,340 | Easton | Apr. 22, 1947 |
| 2,470,895 | Marlowe | May 24, 1949 |
| 2,511,595 | Loughren | June 13, 1950 |

OTHER REFERENCES

Radio Physics Course, by Ghirardi, 2nd ed., pages 166 and 167. Copy in Division 10.